INSERTING MACHINE FOR SMALL COMPONENTS

Filed Dec. 3, 1962 3 Sheets-Sheet 1

INVENTOR
HENRI C. HAVERKORN VAN RIJSEWIJK
BY
Frank R. Jeifari
AGENT

INSERTING MACHINE FOR SMALL COMPONENTS

Filed Dec. 3, 1962 3 Sheets-Sheet 2

INVENTOR
HENRI C. HAVERKORN VAN RIJSEWIJK
BY
AGENT

INSERTING MACHINE FOR SMALL COMPONENTS

Filed Dec. 3, 1962 3 Sheets-Sheet 3

INVENTOR
HENRI C. HAVERKORNVANRIJSEWIJK
BY Frank R. Trifari
AGENT

United States Patent Office 3,257,711

Patented June 28, 1966

3,257,711

INSERTING MACHINE FOR SMALL COMPONENTS

Henri Carel Haverkorn van Rijsewijk, Emmasingel, Eindhoven, Netherlands, assignor to North American Philips Company, Inc., New York, N.Y., a corporation of Delaware Filed Dec. 3, 1962, Ser. No. 241,695
Claims priority, application Netherlands, Dec. 4, 1961, 272,172
5 Claims. (Cl. 29—203)

This invention relates to a method and apparatus for inserting small electrical components, such as capacitors, resistors and the like, having substantially parallel leads projecting therefrom into apertures of a miniature printed circuit board.

Methods and machines for inserting component in large boards are known. However, presently known machines are unsuitable for inserting small component parts into small compact or miniature circuit boards where the component parts must be placed upright side by side in close relation. Also the apertures in the mounting board must be smaller than in a larger board and the projections, or lead wires, of the component parts have therefore correspondingly smaller diameters. As a result higher requirements than normal are imposed on the guide for inserting the leads into the board apertures.

Additionally, the body of a component relative to the leads is never the same in each otherwise identical component since the body is usually dipped in a lacquer and the thickness of the lacquer layer varies within a certain necessarily wide range of tolerances.

In the method and apparatus according to the invention the body of the component part is supported by a gripping member and the leads are also supported over part of their length and near their ends. The part of the gripping member engaging the body of the component and the part of the said gripping member engaging the projecting leads being angularly related so that regardless of variations in the thickness of the lacquer layer of the body the leads to be inserted in the board are always fixed with regard to a part of the gripping member. As a result greater accuracy can be achieved in locating the leads relative to the apertures in the board for receiving said leads.

In placing components in a miniature board, it is often impossible to open the gripping member, since no space is available because of components already positioned. This problem is solved in accordance with the invention by moving the leads of the component against a jig abutment to place the component in a desired position, whereupon a gripping element, comprising two relatively pivotable jaws, grasps said component. One of these jaws is elongated and has as many axial grooves as there are leads on the component part, and these grooves are preferably a little shorter than the leads. This jaw also has at least one groove which is adapted to support the body of the component, and which is slightly deeper at the end adjacent the leads. This one jaw is moved into position closely adjacent or in lightly touching engagement with a component in the jig, whereupon the second jaw, likewise provided with the same number of grooves, but which is at most as long as the body of the component part, is urged against it, said body thus being grasped between the co-acting jaw so that it is now at a small angle to the center lines of the leads thereby causing the ends of the leads to positively engage the end of the elongated jaw. These jaws then carry the component to a position above the apertures in the mounting plate, where, by means of an axial movement of a thrust member which presses on the upper side of the body, only the ends of the projections are introduced into the apertures. Subsequently, the thrust member moves the leads into the apertures throughout their length, the jaws being opened by said latter movement of the thrust member and wholly withdrawn in the axial direction as the thrust member completes insertion of the component.

In another embodiment of the method, in order to facilitate the insertion of the thin projections into the small apertures, and after the first jaw has been moved against the leads, the leads are cut to length by means of a separate cutting device so that they slightly project beyond the jaw and have a sharp point at the end of each lead.

In a preferred embodiment of the apparatus according to the invention, in order to avoid the use of separately operated jaws, the gripping jaws are linked together and opened and closed by the reciprocal movement of the thrust member.

A simple structure of the preferred arrangement is obtained if, in one embodiment of the invention, the short jaw engaging only the body of the component is loaded by a spring and is pivotable at one end about a pivot located on the other jaw, so that the movements of the two jaws may be synchronized more easily.

In another embodiment of the invention, in order to ensure a constrained opening and closure of the jaws, the pivotable jaw is provided with an inclined slot and the thrust member likewise provided with a corresponding inclined surface, and in moving into engagement with the component to be inserted, the inclined surfaces co-act so that a portion of downward movement of the thrust member causes the jaws to be opened against the action of the spring.

A primary object of the invention is to provide an improved method and apparatus for inserting parallel lead components in miniaturized printed wiring boards.

Another object of this invention is to provide an improved gripping head for an inserting machine.

The foregoing objects and further objects and advantages provided by the invention will become evident from the following detailed description of a presently preferred form of the invention as illustrated in the drawing by way of example only.

Figure 1:
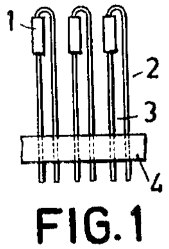
FIGURE 1 shows three resistors each having two substantially axial projections, included in a band and drawn full size.
Figure 2:
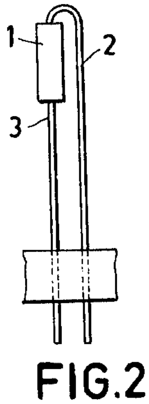
FIGURE 2 shows the same resistors, but on a greatly enlarged scale, in view of the next figures which are shown in proportion to the component part of FIGURE 2.

A resistor 1, shown in FIGURES 1 and 2, has two substantially axial projections 2 and 3 which are held, as is usually the case, between two flexible bands 4 for easy transport and storage, as well as convenient introduction into an inserting machine.

Figure 3:
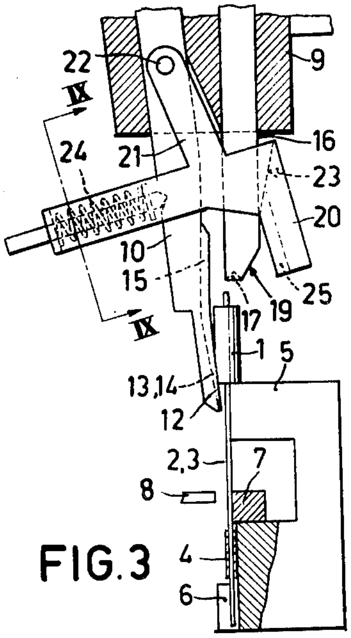
FIGURE 3 shows somewhat diagrammatically the gripping and thrust members of an inserting machine, together with the position of the component part.
Figure 4:
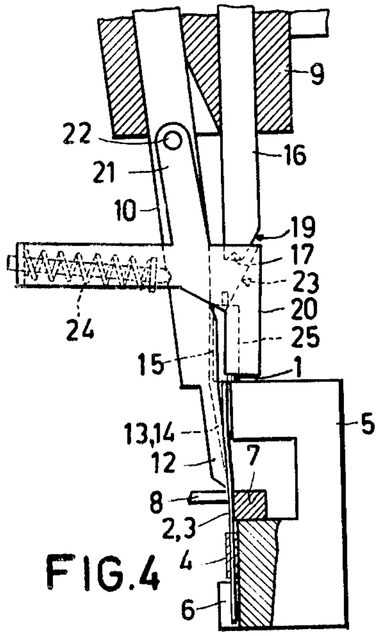
FIGURES 4, 6, 7 and 8 show, likewise diagrammatically, further positions of the inserting mechanism.
Figure 9:
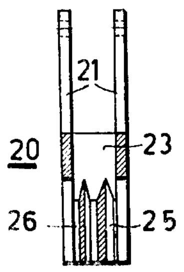
FIGURE 9 is a sectional view of the pivotable jaw of the gripping member shown in FIGURE 3, taken along the line II—II and viewed in the direction of the arrow.
Figure 10:
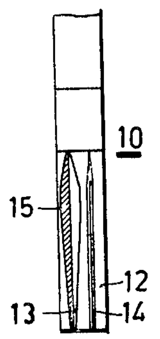
FIGURE 10 shows the inner side of the fixed jaw.

FIGURES 3 and 4 show an abutment or jig 5 at the infeed station of an inserting machine which is engaged by the leads 2 and 3 and body portion of resistor 1 fed thereto. At its lower side the jig 5 has a groove 6 to receive the ends of the leads 2 and 3 projecting from the band 4. The jig 5 also accommodates an anvil 7 of any suitable construction, which co-acts with a cutting knife 8. A fixed distance above the jig is any suitable housing 9 within which a fixed jaw 10 of a gripping member can slide. The fixed jaw 10 has a pointed end 12 having two V-shaped grooves 13 and 14 (FIGURE 10). The two grooves accommodate the leads 2 and 3 of the resistor 1. The groove 13 becomes deeper and deeper towards its end and then constitutes a cavity 15 in which part of the body of resistor 1 may be received. The boundary of said cavity is at a small angle to the center lines of the grooves 13 and 14. The housing 9 also contains an expeller 16 which has a V-shaped groove 17 at its lower end and which is guided rectilinearly in the housing 9. Expeller 16 has an inclined surface 19. A jaw 20 with two arms 21 on each side of the fixed jaw 10 are pivoted on the fixed jaw at 22 (see also FIGURE 9). The two arms 21 define a slot having an inclined surface 23, while the pivotable jaw 20 is biased to closed position by a pressure spring 24. On its inner side the pivotable jaw has a cavity 25 which has approximately the same shape as the cavity 15 in the fixed jaw. Furthermore, a groove 26 (FIGURES 9 and 11) is provided which has likewise approximately the same shape as the groove 14 in the fixed jaw.

Figure 6:
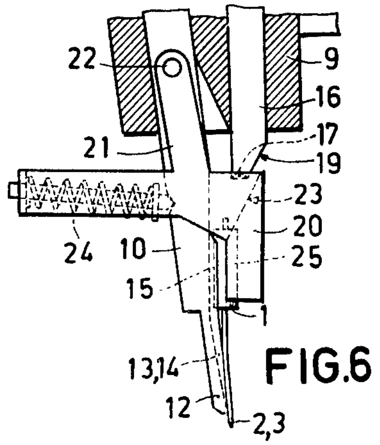
Figure 5:
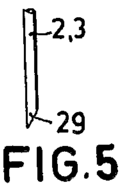
FIGURE 5 shows one end of one projection of the component part after cutting.

The machine operates as follows: The components 1, 2, 3 connected by the bands 4, are periodically moved in any known manner into the position shown in FIGURE 3. As soon as a component has reached this position the fixed jaw 10 slides downwards and descends, without causing damage to the body of the resistor, until the position shown in FIG. 4 is reached. The expeller 16 remains immobile, but the pivotable jaw 20 of course also descends and the lower end of the inclined surface 23 slides along the expeller 16. The cavity 15 has a shape such that its boundary surface is at an angle to the center line of the end of the groove 13 and the whole groove 14, so that upon reaching the position shown in FIGURE 4 only the upper end of the resistor body would engage the upper end of the boundary surface of cavity 15 and the projections 2 and 3 lie only at their lower ends in the grooves 13 and 14. However, upon the downward movement of the fixed jaw 10, which takes along the pivotable jaw 20, the inclined surface 23 of the pivotable jaw slides along the inclined surface 19 of the expeller so that the spring 24 ultimately pushes the pivotable jaw 20 against resistor 1. The resistor thus tilts about its upper end and assumes, as may be seen from FIGURE 6, a slightly inclined position relative to leads 2, 3, it then being received in the space formed by the cavities 15 and 25. The wires 2 and 3 thus lie in part in the grooves 13 and 14, but under a certain tension or bending stress, so that they lie in said grooves under a certain pressure and their position is securely fixed. Now the knife 8 moves to the right and cuts off the ends of the wires 2 and 3 so that a sharp point 29 ensues, as may be seen from FIGURE 5. Furthermore, the wires 2 and 3 with their sharp points 29 slightly project from the lower end of the jaw 12.

Figure 7:
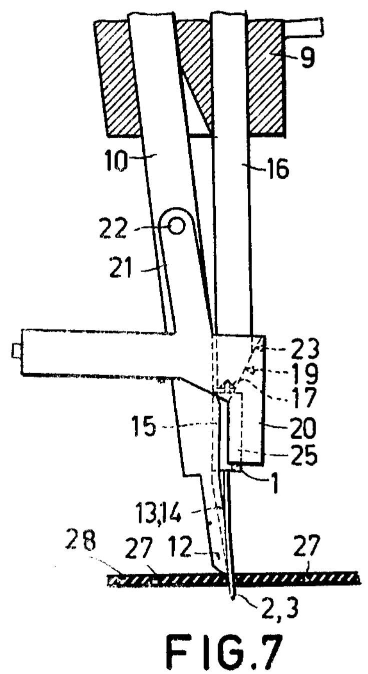
Figure 8:
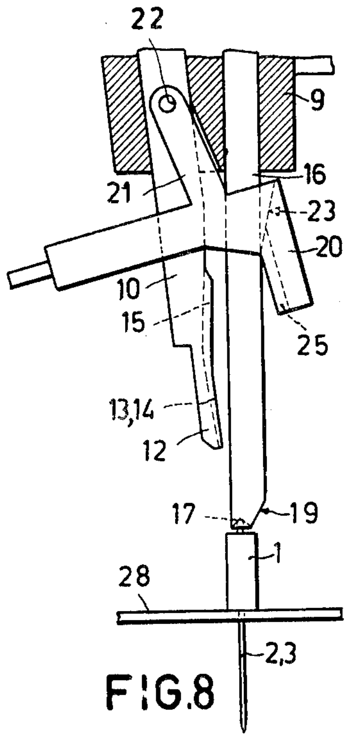

Now the housing 9 is displaced horizontally in known manner until it has arrived above a mounting plate 28 and, after this displacement, both the jaws 10 and 20 and the expeller 16 descend so that the projecting ends of the wires 2 and 3 are inserted into apertures 27 of the mounting plate 28 (FIGURE 7). This may take place despite the fact that the apertures and the wires have only small diameters, the tolerance limit of the diameter of the wires relative to the diameter of the apertures being only small because the position of the wires remains determined as accurately as possible due to the wires lying in at least the ends of the grooves with a certain tension. As may be seen from FIGURE 7, the expeller 16 has now descended and its V-shaped end 17 presses on the resistor. Now the inclined surfaces 19 and 23 start co-acting so that the pivotable jaw 20 begins to open against the action of the spring 24. At the same time that the expeller presses on the resistor, the fixed jaw 10 is again moved upwards and the expeller 16 now pushes the wires completely through the board apertures so that the lower end of resistor 1 bears on the board or mounting plate. The insertion of the component part is now completed; the expeller 16 again moves upwards and the housing 9 is again moved into the position shown in FIGURE 3.

As previously mentioned, the projections 2 and 3 are fixed so that, with correct adjustment of the machine, their ends, projecting from the closed tongs, jaws 10, 20 enter the apertures 27 before the jaws open. Furthermore, the pointed end 12 of the fixed jaw 10 comes closely above the mounting plate only upon inserting the ends of the projections 2 and 3, and this end 12 may be made so that its thickness is not greater than half the thickness of the component part being inserted. Thus, the space occupied by the component parts need in general be determined only by electrical requirements or requirements relating to heat-dissipation. Even for small mounting plates the correspondingly small parts of the above-described machine permits inserting components tightly against one another if this is desired and not prevented by electrical requirements and the like, for when the body of the component to be inserted closely approaches the mounting plate at areas where other parts have already been inserted, the end 12 of the fixed jaw 10 is already moved away.

Several other embodiments of the described machine are possible. Thus, the fixed jaw 10 may be moved into the position shown in FIGURE 4 by a movement of the housing 9 rather than by a sliding movement from above to below, and the pivotable jaw 25 need not turn about a fixed point 22, but may have a separate pivot.

Also the cavity 15 in the fixed jaw may be replaced by two abutments in the fixed jaw which may be engaged by the upper and lower ends of the resistor. The cavity 25 in the pivotable jaw 20 may then be replaced by the central abutment in this jaw.

It is furthermore not necessary for the ends of the projections 2 and 3 to project beyond the tongs after cutting. The body then requires a certain amount of axial play in the closed jaws so that the expeller can slightly displace the body and moves the ends into the apertures before the jaws begin to open.

Figure 11:
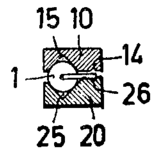
FIGURE 11 is a sectional view of the jaws in the closed condition with the body of a component part present therein.

In view of the comparatively great tolerance which usually occurs in the diameters of the articles to be inserted, it is preferable, as shown in FIGURE 11, that the jaws with their nominal diameter do not close on each other. As a matter of fact, component parts having one or more than two projections may be inserted by the method or the machine and the body of the component part, instead of being cylindrical, may have any desired shape. Furthermore, they need not be included in a band and the projections may already have the correct length when fed into the machine.

Figure 12:
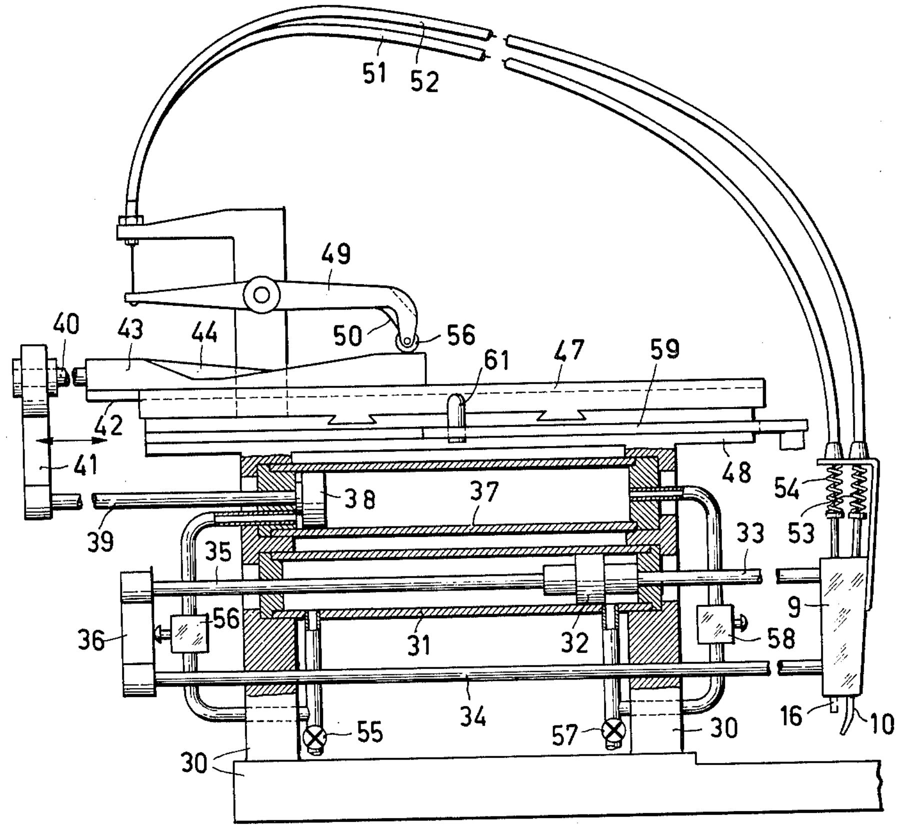
FIGURES 12 and 13 show a preferred arrangement for a machine containing the gripping and thrust members.
Figure 13:
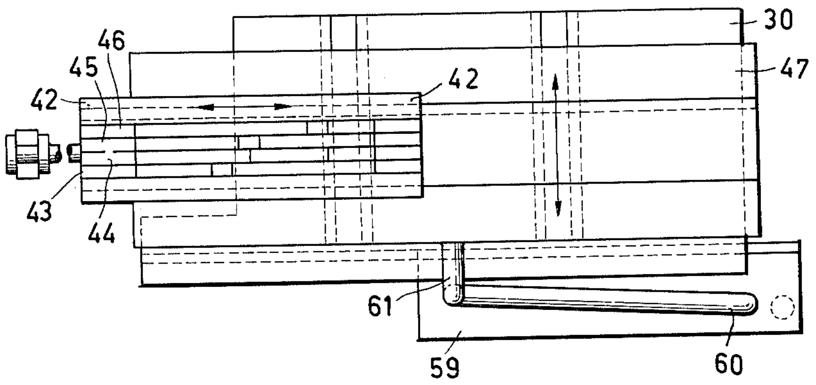

The various related movements of the parts of the machine may be suitably carried out by cams, air or hydraulic systems known and widely used in automatic machine design and manufacture. FIGURES 12 and 13 show a preferred arrangement of the machine for carrying out the various related movements.

In frame 30 there is situated a further pneumatic or hydraulic cylinder 37, the piston 38 of which carries a pistonrod 39. Pistonrod 39 is connected with a rod 40 by a coupling member 41. Rod 40 is attached to a carriage 42, which is provided with four cams 43, 44, 45 and 46 (see FIG. 13). Carriage 42 is slidable in a second carriage 47, the latter being movable on a support 48 in a direction perpendicular to the movement of carriage 42. Two levers 49 and 50, situated behind each other are hingedly secured to frame 30. Two Bowden-cables 51 and 52 connect the levers 49 and 50 with expeller 16 and jaw 10 respectively. Springs 53 and 54 tend to lower jaw 10 and expeller 16.

Assuming the pistons 32 and 38 are in the left end position by opening valve 55 medium flows in cylinder 31 and the housing 9 is moved to the inserting place. In this position coupling member 36 presses against the switch of a valve 56 and medium flows in cylinder 37. This position is shown in FIG. 12. Piston 38 moves to the right (in FIG. 12) and pistonrod 39 moves via rod 40 the carriage 42 with the cams 43, 44, 45 and 46 in right hand direction. Camfollowers 56 on levers 49 and 50 are working on the cams 43 and 45 and via the levers 49, 50, the Bowdencables 51, 52 and the springs 53, 54 the expeller 16 and jaw 10 make the successive inserting movements as described before, due to the shape of cams 43 and 45.

When a component part is inserted in the mounting board, valve 55 is closed and valve 57 is opened. Piston 32 moves to the left end position and housing 9 comes in the supply position. Piston 38 stays in his end position until housing 9 presses against the switch of valve 58. A sheet 59 (FIG. 13) coupled in a suitable manner with rod 33 is provided with a slot 60. An arm 61 is coupled with one end to the transversely slidable carriage 47, the other end of arm 61 lies in the slot 60. When piston 32 moves, sheet 59 moves also and slot 60 will displace arm 61 and cariage 47. When piston 32 moves from the right to the left end position in FIG. 12, the slot 60 will move arm 61 and carriage 47 transversely over such a distance, that the cams 44 and 46 come to lie below the cam followers 56 of the levers 49 and 50. When housing 9 presses against the switch of valve 58, the piston 38 moves to the left, cams 44 and 46 slide in left hand direction and the jaw 10 and the expeller 16 move in such a way, that a component is picked up as described with reference to FIGS. 3–6.

What is claimed is:

1. In a machine for inserting components in a circuit board, said components having depending lead wires extending from a body portion in the same direction in substantially parallel relation comprising, component gripping means having a long jaw and a short jaw for gripping opposite sides of a component; said long jaw having a first portion for engaging the body of a component and a second axially elongated portion for engaging the depending lead wires of said component, said second jaw portion being inclined relative to said first portion for bending said lead wires toward said short jaw, said short jaw having a portion for engaging only the body of said component, means connected with said gripping means for advancing said jaws toward and away from a circuit board, and expeller means connected with said last named means for both opening said jaws and pushing a component held thereby into a circuit board.

2. In a machine according to claim 1 wherein said short jaw is pivotally secured to said long jaw, and said gripping means includes a resilient member interconnected with said jaws for urging said jaws together.

3. In a machine according to claim 2 wherein said expeller means comprises, a rod member slidably connected with said means for advancing said jaws, said rod members being positioned in the last mentioned means for movement between said jaws, said rod member having an inclined surface at one end adjacent said short jaw, said short jaw having an opening therethrough for receiving said rod member, one wall of said opening being inclined for engagement with the inclined surface of said rod member for pivoting said short jaw relative to said long jaw, said one wall and said inclined surface being dimensioned for pivoting said short jaw upon engagement of said rod member with a component held between said jaws.

4. In a machine according to claim 3 with the addition of means for cutting the lead wires of a component held in said gripping means a determined distance from said long jaw.

5. A machine for inserting components having a body portion and depending leads extending axially therefrom in the same direction in substantially parallel relation into a circuit board, comprising a pair of jaw means for gripping a component, one of said jaws having a first portion for engaging the body of a component and a second elongated portion for engaging the depending leads of a component, said second elongated portion being inclined relative to said first portion for bending the component leads toward the other of said pair of jaws, the other of said jaws having a portion for gripping only the body of a component opposite the first portion of said one jaw; expeller means connected with said machine, said expeller means including a rod having an inclined surface at one end for movement between said jaws, said other jaw having end means defining an opening therein remote from the second portion of said one jaw for receiving said one end of said expeller rod, said means defining an opening having an inclined surface substantially parallel with the inclined surface of said rod; the inclined surface of said rod engaging the inclined surface of said jaw upon movement of said rod between said jaws for moving said jaws out of gripping engagement with a component.

References Cited by the Examiner

UNITED STATES PATENTS

| | | | |
|---|---|---|---|
| 2,896,208 | 7/1959 | Alderman et al. | 227—118 |
| 2,901,127 | 8/1959 | Hazel | 214—1 |
| 3,025,593 | 3/1962 | Mueller | 29—203 |
| 3,031,738 | 5/1962 | Paulovitz | 29—155.5 |
| 3,043,001 | 7/1962 | Gluck | 29—203 |
| 3,079,674 | 3/1963 | Shortt | 29—155.5 |
| 3,151,387 | 10/1964 | Clemens et al. | 29—203 |

JOHN F. CAMPBELL, *Primary Examiner.*

ARTHUR M. HORTON, THOMAS H. EAGER, *Examiners.*

J. W. BOCK, *Assistant Examiner.*